US012573295B2

(12) United States Patent
Baba et al.

(10) Patent No.: US 12,573,295 B2
(45) Date of Patent: Mar. 10, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Ichiro Baba, Wako (JP); Kento Shirakata, Wako (JP); Masamitsu Tsuchiya, Wako (JP); Shigenobu Saigusa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 18/603,252

(22) Filed: Mar. 13, 2024

(65) Prior Publication Data

US 2024/0312341 A1 Sep. 19, 2024

(30) Foreign Application Priority Data

Mar. 15, 2023 (JP) ................................ 2023-040619

(51) Int. Cl.
*G08G 1/16* (2006.01)
*G08G 1/0967* (2006.01)

(52) U.S. Cl.
CPC ............. *G08G 1/0967* (2013.01); *G08G 1/16* (2013.01)

(58) Field of Classification Search
CPC ...... G08G 1/0967; G08G 1/16; G08G 1/0137; G08G 1/0116; G08G 1/0129
See application file for complete search history.

(56) References Cited

U.S. PATENT DOCUMENTS

| | | | | |
|---|---|---|---|---|
| 9,481,367 | B1 * | 11/2016 | Gordon | B60W 10/20 |
| 2015/0166062 | A1 * | 6/2015 | Johnson | G08G 1/167 701/41 |
| 2019/0197903 | A1 * | 6/2019 | Ferguson | G08G 1/166 |
| 2019/0286149 | A1 * | 9/2019 | Miura | G06V 20/56 |
| 2020/0231144 | A1 * | 7/2020 | Ueda | B60T 7/12 |
| 2021/0004615 | A1 * | 1/2021 | Yashiro | B60W 10/20 |
| 2022/0203985 | A1 * | 6/2022 | Yashiro | B60W 30/165 |
| 2023/0303065 | A1 * | 9/2023 | Cho | B60W 30/18027 |

FOREIGN PATENT DOCUMENTS

JP 2018-092505 6/2018

* cited by examiner

*Primary Examiner* — Nay Tun
(74) *Attorney, Agent, or Firm* — Amin, Turocy & Watson, LLP

(57) ABSTRACT

A driving assistance device that is one aspect of the embodiment includes a recognizer configured to recognize surrounding conditions of a host vehicle, a determiner configured to determine whether the host vehicle is able to pass through a traveling section ahead on the basis of a result of the recognition by the recognizer, and an output controller configured to cause an output to output information based on a result of the determination by the determiner, in which, when a first distance between a marking line for dividing a traveling path of the host vehicle, which is recognized by the recognizer, and an obstacle in front of the host vehicle is equal to or greater than a predetermined distance, the determiner determines that the host vehicle is able to pass next to the obstacle.

6 Claims, 6 Drawing Sheets

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2023-040619, filed Mar. 15, 2023, the content of which is incorporated herein by reference.

BACKGROUND

Field of the Invention

The present invention relates to a driving assistance device, a driving assistance method, and a storage medium.

Description of Related Art

In recent years, efforts have become active to provide access to sustainable transport systems that take into account the most vulnerable of traffic participants. To achieve this goal, there has been focus on research and development which will further improve traffic safety and convenience through research and development on driving assistance technologies. In relation to this, conventionally, a technology is known that determines whether a host vehicle is passing another vehicle using a camera provided in the host vehicle, and when the host vehicle is passing another vehicle, notifies the driver of the surrounding conditions of the host vehicle and ends the notification in response to completion of passing (for example, Japanese Unexamined Patent Application, First Publication No. 2018-92505).

SUMMARY

Incidentally, in driving assistance technology, depending on road conditions, it may not be possible to appropriately determine whether a vehicle can travel in a traveling section ahead. For this reason, there has been a problem that appropriate driving assistance may not be provided to the driver of a vehicle.

To solve the problems described above, one of the purposes of this application is to provide a driving assistance device, a driving assistance method, and a storage medium that can provide the driver of a vehicle with more appropriate driving assistance. This consequently contributes to the development of a sustainable transportation system as well.

A driving assistance device, a driving assistance method, and a storage medium according to the present invention have adopted the following configuration.

(1): A driving assistance device according to one aspect of the present invention includes a recognizer configured to recognize surrounding conditions of a host vehicle, a determiner configured to determine whether the host vehicle is able to pass through a traveling section ahead on the basis of a result of the recognition by the recognizer, and an output controller configured to cause an output to output information based on a result of the determination by the determiner, in which, when a first distance between a marking line for dividing a traveling path of the host vehicle, which is recognized by the recognizer, and an obstacle in front of the host vehicle is equal to or greater than a predetermined distance, the determiner determines that the host vehicle is able to pass next to the obstacle.

(2): In the aspect of (1) described above, when the first distance is less than the predetermined distance, the recognizer may recognize a second distance between a boundary of a free space present on an opposite side of the obstacle when viewed from the marking line and the marking line, and when the second distance is equal to or greater than the predetermined distance, the determiner may determine that the host vehicle is able to pass next to the obstacle by crossing the marking line.

(3): In the aspect of (2) described above, when the recognizer recognizes a part serving as the boundary of the free space as a wall, and a degree of recognition of the wall is less than a threshold value, the determiner may determine that the host vehicle is not able to pass next to the obstacle even if the second distance is equal to or greater than the predetermined distance.

(4): In the aspect of (2) described above, the determiner may determine that the host vehicle is not able to pass next to the obstacle by crossing the marking line when a distance from the marking line to the boundary of the free space is equal to or greater than an upper limit distance.

(5): In the aspect of (1) described above, the predetermined distance may be made different depending on whether the obstacle is a static obstacle or a dynamic obstacle.

(6): A driving assistance method according to another aspect of the present invention includes, by a computer, recognizing surrounding conditions of a host vehicle, determining whether the host vehicle passes through a traveling section ahead on the basis of a result of the recognition, causing an output to output information based on a result of the determination, and determining that the host vehicle is able to pass next to the obstacle when a first distance between a recognized marking line for dividing a traveling path of the host vehicle and an obstacle in front of the host vehicle is equal to or greater than a predetermined distance.

(7): A storage medium according to still another aspect of the present invention is a computer-readable non-transitory storage medium that has stored a program causing a computer to execute recognizing surrounding conditions of a host vehicle, determining whether the host vehicle passes through a traveling section ahead on the basis of a result of the recognition, causing an output to output information based on a result of the determination, and determining that the host vehicle is able to pass next to the obstacle when a first distance between a recognized marking line for dividing a traveling path of the host vehicle and an obstacle in front of the host vehicle is equal to or greater than a predetermined distance.

According to the aspects of (1) to (7) described above, it is possible to provide the driver of a vehicle with more appropriate driving assistance.

DETAILED DESCRIPTION OF THE INVENTION

Hereinafter, embodiments of a driving assistance device, a driving assistance method, and a storage medium of the present invention have been described. In the following description, a case will be described in which the left-hand driving regulations are applied, but when the right-hand driving regulations are applied, left and right may be read in reverse.

[Overall Configuration]

Figure 1:
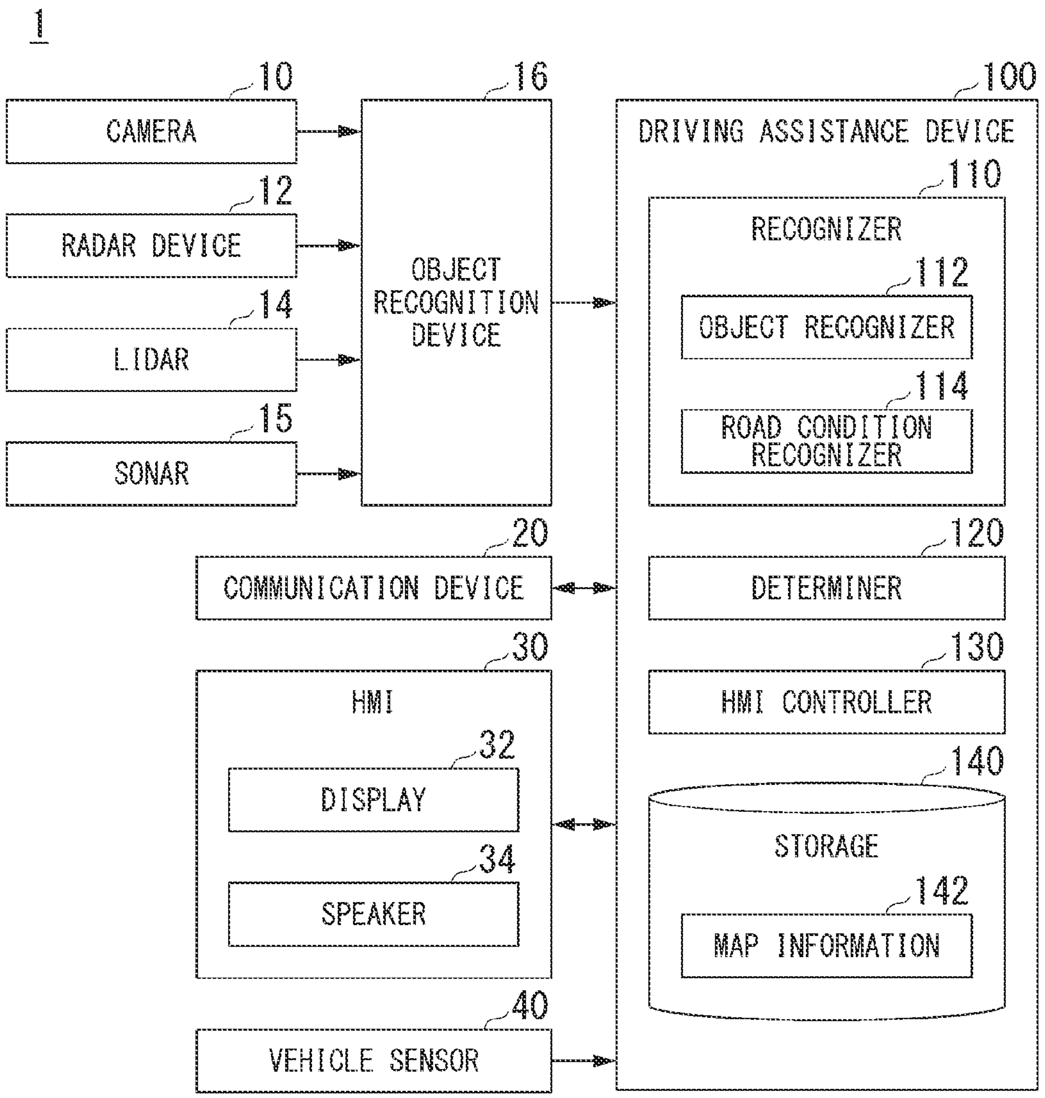
FIG. 1 is a configuration diagram of a vehicle system using a driving assistance device according to an embodiment.

FIG. 1 is a configuration diagram of a vehicle system 1 using a driving assistance device according to an embodiment. A vehicle in which the vehicle system 1 is mounted (hereinafter, referred to as a host vehicle) is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, a sonar 15, an object recognition device 16, a communication device 20, a human machine interface (HMI) 30, a vehicle sensor 40, and a driving assistance device 100. These devices and apparatuses are connected to each other by a multiplex communication line such as a controller area network (CAN) communication line, a serial communication line, a wireless communication network, or the like. Constituents shown in FIG. 1 are merely an example, and a part of the constituents may be omitted or another constituent may be added. The HMI 30 is an example of an "output."

The camera 10 is a digital camera that uses a solid-state image sensor such as a charge coupled device (CCD) or a complementary metal oxide semiconductor (CMOS). The camera 10 is attached to an arbitrary place on a host vehicle in which the vehicle system 1 is mounted. When an image of the front is captured, the camera 10 is attached to an upper part of the front windshield, a back surface of the windshield rear-view mirror, and the like. The camera 10 periodically and repeatedly captures, for example, a periphery of the host vehicle. The camera 10 may be a stereo camera.

The radar device 12 emits radio waves such as millimeter waves around the host vehicle and detects radio waves reflected by an object (reflected waves) to detect at least a position (a distance and a direction) of the object. The radar device 12 is attached to arbitrary place on the host vehicle. The radar device 12 may detect the position and a speed of the object using a frequency modulated continuous wave (FM-CW) method.

The LIDAR 14 irradiates a periphery of the host vehicle with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the host vehicle. The LIDAR 14 detects a distance from the host vehicle to the target by performing scanning in horizontal and vertical directions with respect to a traveling direction of the host vehicle.

The sonar 15 detects a distance to an object, a position thereof, or the like by emitting ultrasonic waves around the host vehicle and detecting reflection or scattering by the object present within a predetermined distance from the host vehicle. The sonar 15 is provided at, for example, a front end and a rear end of the host vehicle, and on a bumper or the like.

The object recognition device 16 performs sensor fusion processing on results of the detection by some or all of the camera 10, the radar device 12, the LIDAR 14, and the sonar 15, and recognizes the position, type, speed, and the like of the object. The object recognition device 16 outputs results of the recognition to the driving assistance device 100. The object recognition device 16 may output the results of the detection by the camera 10, the radar device 12, the LIDAR 14, and the sonar 15 to the driving assistance device 100 as they are. The object recognition device 16 may be omitted from the vehicle system 1 by incorporating a function of the object recognition device 16 into the driving assistance device 100.

The communication device 20 communicates with, for example, other vehicles present around the host vehicle, a terminal device of the driver using the host vehicle, or various server devices using, for example, a cellular network, a Wi-Fi network, a Bluetooth (a registered trademark), dedicated short range communication (DSRC), a local area network (LAN), a wide area network (WAN), or a network such as the Internet.

The HMI 30 presents various types of information to an occupant of the host vehicle M and receives an input operation by the occupant. The HMI 30 includes, for example, a display 32 and a speaker 34. The display 32 may be, for example, a display device provided in a meter or at a center of an instrument panel, or a head-up display (HUD). The speaker 34 may be, for example, a voice output device provided in a compartment of the host vehicle. In addition to the display 32 and the speaker 34, the HMI 30 may include a buzzer, a touch panel, a switch, a key, a microphone, and the like.

The vehicle sensor 40 includes a vehicle speed sensor that detects a speed of the host vehicle M, an acceleration sensor that detects acceleration, a yaw rate sensor that detects a yaw rate (for example, a rotational angular speed around a vertical axis passing through a center of gravity of the host vehicle), and an azimuth sensor that detects a direction of the host vehicle M, and the like. The vehicle sensor 40 may be provided with a position sensor that detects the position of the host vehicle. The position sensor is, for example, a sensor that acquires position information (longitude and latitude information) from a global positioning system (GPS) device. The position sensor may be a sensor that acquires position information using a global navigation satellite system (GNSS) receiver.

The driving assistance device 100 is a device that assists a driver in driving the host vehicle. The driving assistance device 100 includes, for example, a recognizer 110, a determiner 120, an HMI controller 130, and a storage 140. The recognizer 110, the determiner 120, and the HMI controller 130 are each realized by a hardware processor such as a central processing unit (CPU) executing a program (software). Some or all of these components may be realized by hardware (a circuit part; including circuitry) such as large scale integration (LSI), an application specific integrated circuit (ASIC), a field-programmable gate array (FPGA), and a graphics processing unit (FPGA), and a graphics processing unit (GPU), or may be realized by software and hardware in cooperation. A program may be stored in advance in a storage device (a storage device having a non-transitory storage medium) such as an HDD or a flash memory of the driving assistance device 100, or may be stored in a detachable storage medium such as a DVD or a CD-ROM and installed in the HDD or the flash memory of the driving assistance device 100 by the storage medium (non-transitory storage medium) being attached to a drive device. The HMI controller 130 is an example of an "output controller."

The storage 140 may be realized by the various storage devices described above, an electrically erasable programmable read only memory (EEPROM), a read only memory (ROM), a random access memory (RAM), or the like. The storage 140 stores, for example, information, programs, and various other types of information necessary to execute various types of control in the embodiment. The storage 140 may include map information 142. The map information 142 is, for example, information in which road shapes are expressed by links indicating a road in a predetermined section and nodes connected by the links. The map information 142 may include point of interest (POI) information or may include information regarding road shapes, road structures, and the like. Road shapes include, for example, branching and merging, a tunnel (an entrance and an exit), a curved road (an entrance and an exit), a curvature, a radius of the curvature, the number of lanes, a width, a slope, and the like of a road or a road marking line (hereinafter referred to as a "marking line"). The information regarding road structures may include information such as types, positions, orientations with respect to an extension direction of a road, sizes, shapes, and colors of road structures. For the types of road structures, for example, marking lines may be set to one type, and lane marks that belong to the marking lines, curbs, median strips, and walls (including fences, and the like) installed along the extension direction of a road may each be set to different types. The map information 142 may be updated at any time by the communication device 20 communicating with other devices.

The recognizer 110 recognizes surrounding conditions of the host vehicle on the basis of information input from at least one of the camera 10, the radar device 12, the LIDAR 14, and the sonar 15, or information input via the object recognition device 16. The recognizer 110 includes, for example, an object recognizer 112 and a road condition recognizer 114.

The object recognizer 112 recognizes states of a host vehicle and an object present around (within a predetermined distance) the host vehicle, such as types, positions, sizes (including heights), speeds, and acceleration. The type of an object may be, for example, whether the object is a vehicle, a pedestrian, a telephone pole, or the like, or may be a type for identifying each vehicle. The position of an object may be recognized as, for example, a position of an absolute coordinate system (hereinafter referred to as a vehicle coordinate system) with the origin at a representative point (a center of gravity, a drive shaft center, or the like) of the host vehicle. The position of an object may be represented by a representative point such as a center of gravity, a corner, or a tip portion in a traveling direction of the object, or may be represented by an expressed area. For example, speed includes speeds of the host vehicle and other vehicles in the traveling direction (a vertical direction) of a lane in which they are traveling (hereinafter referred to as a longitudinal speed), and the speeds of the host vehicle and other vehicles in a horizontal direction of the lane (hereinafter referred to as a lateral speed). The "states" of an object include, for example, acceleration, jerk, or a "behavior state" (for example, whether it is changing lanes or trying to change lanes) of the object when the object is a mobile body such as other vehicle.

The object recognizer 112 recognizes, among the recognized objects, an object that is present in a traveling section in front of the host vehicle (for example, in the traveling direction of the host vehicle and within a predetermined distance from the host vehicle) as an obstacle. Even if an object is present in front of the host vehicle, the object recognizer 112 does not recognize the object as an obstacle when the object satisfies a predetermined condition such as a preceding vehicle of the host vehicle M (for example, an object whose amount of change in relative distance or relative speed during a predetermined time is less than a threshold value). In addition, the object recognizer 112 may also recognize whether the obstacle is a dynamic obstacle that is moving by itself, such as an oncoming vehicle or a pedestrian, or a static obstacle that is currently stationary, such as a utility pole, a parked vehicle, or an abandoned object.

The road condition recognizer 114 recognizes conditions of a road on which the host vehicle is traveling. Road conditions include, for example, a position of a marking line for dividing the road, a position of a road boundary, and conditions of an area from the marking line to the road boundary (hereinafter referred to as a "free space" as necessary). A road boundary is a boundary of an area in which the host vehicle can travel, and, for example, when there is an object such as a wall or a curb at an end of a road surface or further away (outside) from a marking line when viewed from the host vehicle, it serves as a position of an end of a road side of the object. The road condition recognizer 114 may recognize a distance between an object recognized by the object recognizer 112 and a marking line, a distance between an object and a road boundary, and the like. The road condition recognizer 114 may also recognize whether the road on which the host vehicle is traveling is a narrow road (a road width (width) or a lane width is less than a predetermined value).

The object recognizer 112 and the road condition recognizer 114 may set a degree of recognition for the recognized object. A degree of recognition is an index value indicating a certainty (accuracy) of a recognized object.

Based on a result of the recognition by the recognizer 110, the determiner 120 determines whether the host vehicle can pass through the traveling section ahead. For example, the determiner 120 determines whether the vehicle can pass next to an obstacle without coming into contact with it on the basis of a distance between the marking line for dividing the traveling path (for example, a road) of the host vehicle, which is recognized by the recognizer 110, and an obstacle present in front of the vehicle. Details of a function of the determiner 120 will be described below.

The HMI controller 130 causes the HMI 30 to output predetermined information and notifies the driver of the host vehicle of it on the basis of the result of the recognition by the recognizer 110, a result of the determination by the determiner 120, and the like. The predetermined information includes, for example, information regarding the traveling of the host vehicle, such as information regarding the state of the host vehicle and driving assistance information. The information regarding the state of the host vehicle includes, for example, information such as the speed of the host vehicle, the engine speed, and the shift position. The driving assistance information includes, for example, information that assists a steering operation or a speed operation of the occupant to avoid contact of the host vehicle with an obstacle. The driving assistance information may include, for example, information indicating whether the host vehicle can travel in a traveling section ahead, information regarding a future traveling route, and the like. The predetermined information may include information that is not related to traveling control of the host vehicle, such as television programs received by the communication device 20 and other content (for example, voice and video). The predetermined information may include, for example, information regarding a current position, a destination, and a remaining amount of fuel of the host vehicle.

For example, the HMI controller 130 may generate an image including the predetermined information described above and cause the display 32 of the HMI 30 to display the generated image, or may generate a voice indicating predetermined information and cause the speaker 34 of the HMI 30 to output the generated voice.

[Determination on Passage Possibility by Determiner]

Next, processing of determining, by the determiner 120, whether the vehicle can pass through the traveling section will be specifically described. In the following description, the determination processing by the determiner 120 will be described by dividing it into several patterns. Determination patterns shown below are all determination patterns when the road in which the host vehicle is traveling is a narrow road. In the following description, when the host vehicle passes next to an object (a static obstacle or a dynamic obstacle), this includes a case where the host vehicle and the object pass each other, or where the host vehicle overtakes the object.

[First Determination Pattern]

Figure 2:
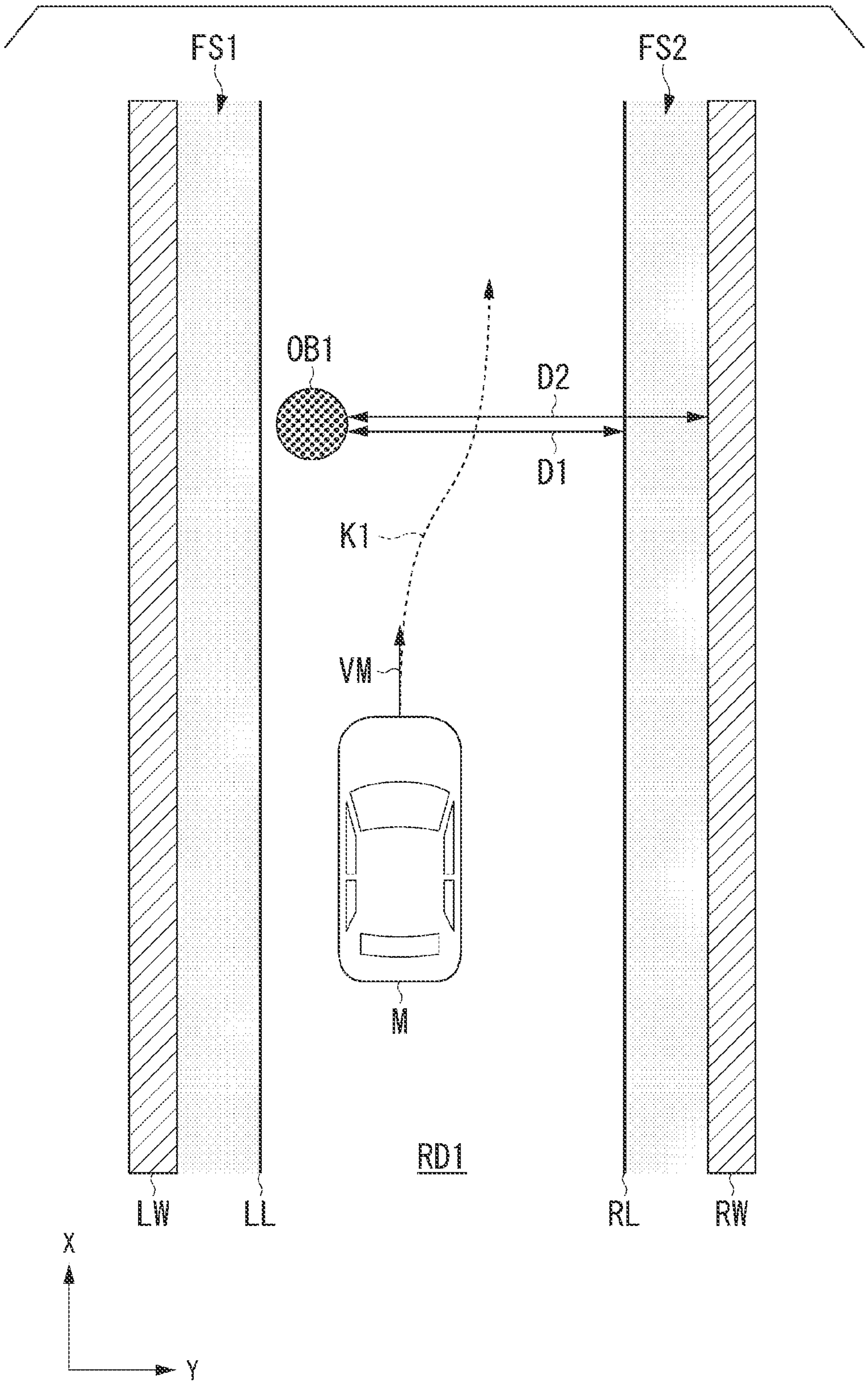
FIG. 2 is a diagram for describing a first determination pattern.

FIG. 2 is a diagram for describing a first determination pattern. In an example of FIG. 2, the host vehicle M is traveling in an extension direction (an X-axis direction in FIG. 2) at a speed VM on a road RD1 divided by left and right marking lines LL and RL. In FIG. 2, an object OB1 indicates a utility pole present on the road RD1, but it may also be a static obstacle other than a utility pole (for example, a parked vehicle or an abandoned object). In the example of FIG. 2, it is assumed that a wall LW is present along the marking line LL farther away (outside) than the marking line LL when viewed from the host vehicle M, and a wall RW is present along the marking line RL farther away from the marking line RL.

For example, the object recognizer 112 recognizes a position, a type, a size, and the like of the object OB1 that is present in front of the host vehicle M (in the traveling direction thereof) on the basis of the information input from at least one of the camera 10, the radar device 12, the LIDAR 14, and the sonar 15, or the information input via the object recognition device 16. The object recognizer 112 recognizes positions and heights of the walls LW and RW.

The road condition recognizer 114 recognizes the positions of the marking lines LL and RL of the road RD on which the host vehicle M travels on the basis of the information input from at least one of the camera 10, the radar device 12, the LIDAR 14, and the sonar 15, or the information input via the object recognition device 16. The road condition recognizer 114 recognizes an area between the marking line LL and the wall LW as a free space FS1, and recognizes an area between the marking line RL and the wall RW as a free space FS2. The free spaces FS1 and FS2 are areas in which the host vehicle M does not enter when it travels normally on the road RD1, but are areas in which the host vehicle M may travel into which the host vehicle M temporarily enters when it avoids contact with an obstacle. The free spaces FS1 and FS2 can also be used when the vehicle M is temporarily parked on a street. The road condition recognizer 114 may recognize positions of the walls LW and RW (the respective surfaces on the road RD1 side) as outer boundary positions of the free spaces FS1 and FS2. The road condition recognizer 114 may recognize a distance between the object OB1 and the marking lines LL and RL, and a distance between the object OB1 and the free spaces FS1 and FS2.

In the first determination pattern, the determiner 120 determines, on the basis of results of the recognition by the object recognizer 112 and the road condition recognizer 114, whether the host vehicle M can travel next to the object OB1 without coming into contact with the object OB1 and passes it (whether it is possible to pass by the object OB1). In this case, the road condition recognizer 114 first recognizes a first distance D1 from the object OB1 to the marking line RL that is present far away (at a distant position) among the marking lines LL and RL. The first distance D1 is the shortest distance between the object OB1 and the marking line RL, and is a distance in a horizontal direction (a Y-axis direction) of the road RD1 in FIG. 2.

The determiner 120 determines that the vehicle M can travel on the road RD1 and pass next to the object OB1 when the first distance D1 is equal to or greater than a predetermined distance, and determines that the vehicle M cannot pass next to the object OB1 while traveling on the road RD1 when the first distance D1 is less than the predetermined distance. The predetermined distance may be set according to a vehicle width of the host vehicle M, and a predetermined margin width (plus a) may be added to the vehicle width. The margin width may be a fixed value, or may be set variably depending on the speed of the host vehicle M, the shape of a road, a past driving tendency of the driver, and the like. Traveling on the road RD1 described above means that the host vehicle M travels without crossing the marking lines LL and RL (without entering the free spaces FS1 and FS2).

If the first distance D1 is less than the predetermined distance, the road condition recognizer 114 recognizes a second distance D2 from the object OB1 to the wall RW that is present farther away than the marking line RL (in other words, a boundary of the free space FS2 on the opposite side of the object OB1 when viewed from the marking line RL). Then, when the recognized second distance D2 is equal to or greater than a predetermined distance, the determiner 120 determines that the host vehicle M can pass next to the object OB1 while traveling by crossing the marking line RL (entering the free space FS2), and determines that the host vehicle M cannot pass next to the object OB1 when the distance is less than the predetermined distance. Crossing the marking line RL means that a part of the host vehicle M enters the free space FS2, and may include straddling or crossing the marking line RL.

When the determiner 120 determines that the host vehicle M can pass next to the object OB1, the HMI controller 130 generates information such as information indicating that the host vehicle can pass or an image indicating a route (a recommended route) K1 through which the host vehicle M needs to pass, and causes the HMI 30 to output the generated information. The route K1 is a route for the host vehicle M to travel without coming into contact with the object OB1 or the wall RW. The same applies to other routes K2 to K4, which will be described below. The HMI controller 130 may generate an image or voice indicating a steering direction by the driver or an image or voice prompting the vehicle M to decelerate, and may cause the HMI 30 to output the generated information.

When the determiner 120 determines that the host vehicle M cannot pass next to the object OB1, the HMI controller 130 generates information indicating that the host vehicle M cannot pass next to the object OB1 and causes the HMI 30 to output it, or generates information that suggests the vehicle M to return to the road RD1 and causes the HMI 30 to output it. As a result, when the object OB1 is present in the traveling section in front of the host vehicle M, it is possible to perform more appropriate driving assistance for the driver by providing the driver with driving assistance information such as passage possibility and future driving details of the host vehicle M. By providing the driving assistance information described above, the driver can quickly perform driving in accordance with road conditions without having to keep considering whether the vehicle can pass next to the object OB1.

In the example of FIG. 2, when the recognizer 110 recognizes that a part serving as the boundary of the free space FS2 is the wall RW, and when a degree of recognition of the wall RW is less than a threshold value, the determiner 120 may determine that the host vehicle M cannot pass next to the obstacle OB1 by crossing the marking line RL (in other words, the host vehicle M cannot pass next to the object OB1 by crossing the marking line RL) even if the second distance D2 is equal to or greater than a predetermined distance. The recognizer 110 recognizes that an object is a wall, for example, when a height of the object is equal to or greater than a predetermined value and a length of the object in an extension direction of the road RD1 is equal to or greater than a predetermined length.

The degree of recognition described above is set by the object recognizer 112. For example, when a numerical value indicating an accuracy of a recognized object is output by sensor fusion processing on results of the detection by some or all of the camera 10, the radar device 12, the LIDAR 14, and the sonar 15, the object recognizer 112 sets the degree of recognition to be higher as the numerical value increases. The object recognizer 112 may refer to the map information 142 stored in the storage 140 on the basis of position information of the host vehicle M obtained from a position sensor of the vehicle sensor 40, compare information on a road condition around the host vehicle M obtained from the map information 142 and a result of the sensor fusion processing, and perform setting so that the degree of object recognition is higher as a degree of matching increases. The object recognizer 112 may perform setting so that the degree of recognition becomes small (less than a threshold value) when a boundary position of an object cannot be recognized (for example, when a free space is narrow and the boundary position is too close to the marking line to be recognized). The object recognizer 112 may perform setting so that the degree of recognition decreases as a distance between the host vehicle M and the recognized object increases, and may also set the degree of recognition depending on weather or a time of day, a shape of a road, a shape of the object, or the like.

As a result, it is possible to suppress an erroneous determination that the host vehicle M can travel by crossing the marking line RL and pass next to the object OB1 under a condition in which the position of the wall RW (an area of the free space FS2) is erroneously recognized and the host vehicle M cannot actually travel next to the marking line RL. For example, when the boundary of the free space FS2 is a wall, a damage to the host vehicle M at the time of contact is greater than when the boundary is a curb, so that it is possible to provide safer driving assistance information according to the control described above.

The HMI controller 130 may cause the HMI 30 to output information indicating that it has been determined that the host vehicle M cannot pass next to the object OB1 by crossing the marking line RL because the degree of recognition of an object (the wall RW) is less than the threshold value. As a result, the driver of the host vehicle M can perform driving by actually checking a position of the wall RW and determining whether the host vehicle can pass next to the object OB1. The determination processing including the degree of the recognition described above may be similarly performed for other determination patterns to be described below.

[Second Determination Pattern]

Figure 3:
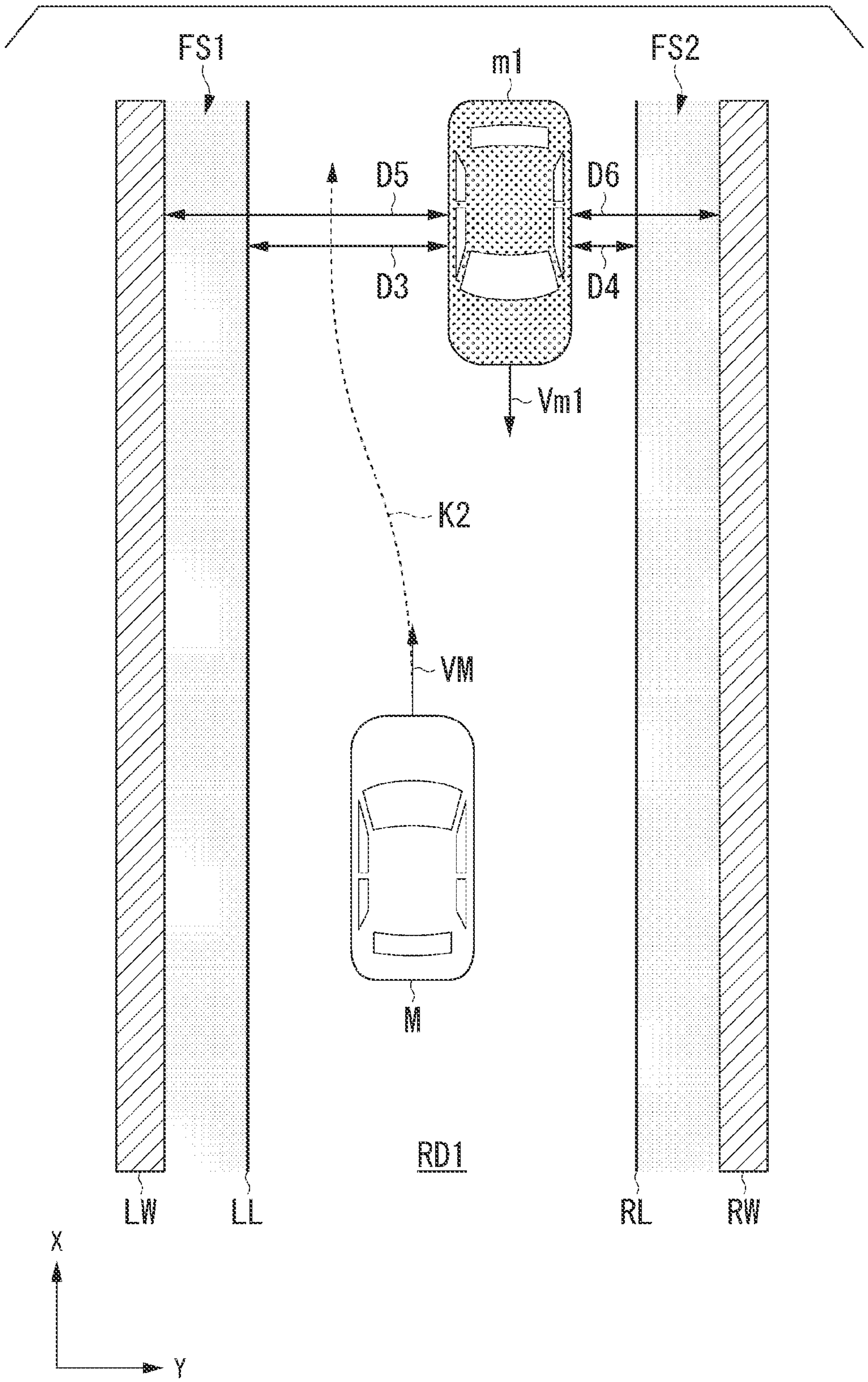
FIG. 3 is a diagram for describing a second determination pattern.

Next, a second determination pattern will be described. The second determination pattern differs from the first determination pattern in that the obstacle is not a static obstacle but a dynamic obstacle such as an oncoming vehicle. FIG. 3 is a diagram for describing the second determination pattern. The example in FIG. 3 shows a scene where an oncoming vehicle (other vehicle m1) is approaching the host vehicle M traveling on the road RD1 described above at a speed Vm1.

In the second determination pattern, the determiner 120 determines whether the host vehicle M can pass next to the other vehicle m1 without coming into contact with the other vehicle m1 (whether it can pass the other vehicle m1). In this case, the road condition recognizer 114 recognizes distances D3 and D4 from the other vehicle m1 to the left and right marking lines LL and RL, respectively. The road condition recognizer 114 may recognize distances D5 and D6 from the other vehicle m1 to the boundaries of the left and right free spaces FS1 and FS2, respectively. Then, the determiner 120 determines that the host vehicle M can travel on the road RD1 and pass next to the other vehicle m1 when a distance D3 (hereinafter referred to as a "third distance D3") between the marking line LL, which is far from the other vehicle m1, among the marking lines LL and RL and the other vehicle m1 is equal to or greater than a predetermined distance, and determines that the host vehicle M cannot pass next to the other vehicle m1 while traveling on the road RD1 when the third distance D3 is less than a predetermined distance. Here, the predetermined distance in the second determination pattern may be set according to a vehicle width of the host vehicle M, and may further include a predetermined margin width with respect to the vehicle width. Furthermore, the other vehicle m1 is a dynamic obstacle and can move in a horizontal direction (a Y-axis direction in FIG. 3) of the road RD1. For this reason, the determiner 120 may estimate a movable width in the horizontal direction of the other vehicle m1 on the basis of a distance D4 or a distance D6 recognized by the recognizer 110 and/or the type, speed, or the like of the other vehicle m1, and adjust the predetermined distance according to the estimated movable width. For example, when the host vehicle passes the other vehicle m1, there is a high likelihood that the other vehicle m1 will move in a direction to avoid the host vehicle M (in a direction to the wall RW side), so that a distance shorter than the predetermined distance in the first determination pattern may be set.

When the third distance D3 is less than the predetermined distance, the determiner 120 determines whether a distance D5 (hereinafter referred to as a "fourth distance D5") from the other vehicle m1 to the wall LW present farther away than the marking line LL (in other words, the boundary of the free space FS1 present on the opposite side of the other vehicle m1 when viewed from the marking line LL) is equal to or greater than the predetermined distance. The determiner 120 determines that the host vehicle M can pass next to the other vehicle m1 while traveling by crossing the marking line LL (entering the free space FS1) when the fourth distance D5 is equal to or greater than the predetermined distance, and determines that the host vehicle M cannot pass next to the other vehicle m1 when the distance is less than the predetermined distance.

When the determiner 120 determines that the host vehicle M can pass next to the other vehicle m1, the HMI controller 130 generates information such as information indicating that the host vehicle M can pass or an image indicating a route K2 through which the host vehicle M needs to pass, and causes the HMI 30 to output the generated information. In addition, when the determiner 120 determines that the host vehicle M cannot pass next to the other vehicle m1, the HMI controller 130 causes the HMI 30 to output information indicating that the host vehicle M cannot pass next to the object OB1, or causes the HMI 30 to output information suggesting a return to the road RD1. Furthermore, the HMI controller 130 may prompt the host vehicle M to stop temporarily, and may instruct the other vehicle m1 to pass next to the host vehicle M. The HMI controller 130 may generate an image or voice indicating a steering direction by the driver or an image or voice prompting the vehicle M to decelerate (including a temporary stop), and cause the HMI 30 to output the generated information.

According to the second determination pattern described above, in addition to having the same effects as the first determination pattern described above, it is possible to perform more appropriate driving assistance, including when passing due to movement of a dynamic obstacle.

The determiner 120 may change the determination condition (more specifically, the predetermined distance) depending on whether the obstacle in front of the host vehicle M is a static obstacle or a dynamic obstacle. In this case, the determiner 120 makes the predetermined distance, for example, when a target is a dynamic obstacle (for example, an oncoming vehicle), larger than the predetermined distance when a target is a static obstacle. Therefore, in a determination pattern between the static obstacle (object OB1) shown in FIG. 2 and the dynamic obstacle (other vehicle m1) shown in FIG. 3, the distance D3 for determining that the host vehicle can pass next to the obstacle is greater than the distance D1, and the distance D5 is greater than the distance D2. In the case of a dynamic obstacle such as an oncoming vehicle, a course may deviate to the left or right, so that it is possible to give more leeway to driving by increasing the predetermined distance. When other vehicle that is a dynamic obstacle is parked or temporarily stopped, the determiner 120 may regard it as a static obstacle and determine whether the host vehicle can pass next to the other vehicle. By performing such determination processing, it is possible to perform more appropriate determination depending on a road condition and a type of an obstacle.

[Third Determination Pattern]

Figure 4:
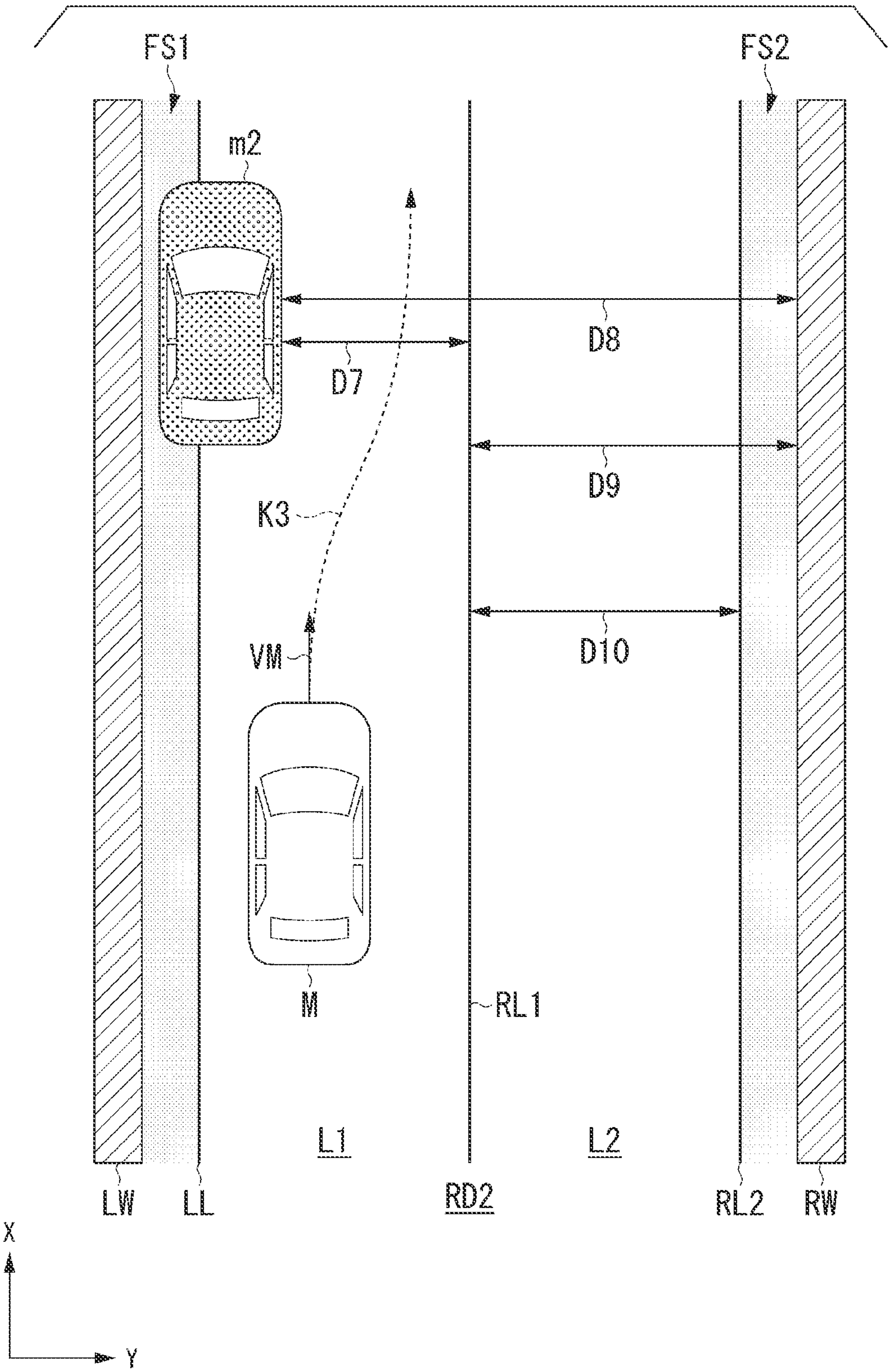
FIG. 4 is a diagram for describing a third determination pattern.

Next, a third determination pattern will be described. The third determination pattern is a determination pattern when a plurality of marking lines are recognized on one of the left or right side of the host vehicle M. FIG. 4 is a diagram for describing the third determination pattern. In the example of FIG. 4, a road RD2 on which the host vehicle M travels has two marking lines RL1 and RL2 on the right side of the host vehicle M, and the free space FS2 and the wall RW, which is an outer boundary of the free space FS2, are present along the marking line RL2 farther away from the marking line RL2 when viewed from the host vehicle M. That is, the road RD2 has a first lane L1 divided by the marking lines LL and RL1, and a second lane L2 divided by the marking lines RL1 and RL2. The second lane L2 may be an oncoming lane, or may be an adjacent lane in which the host vehicle can travel in the same direction as the first lane L1. On the left side of the host vehicle M on the road RD2, there are the marking line LL, the free space FS1, and the wall LW (a boundary of the free space FS1), similar to the road RD1.

In the example of FIG. 4, the recognizer 110 recognizes positions of the marking lines LL, RL1, and RL2 and positions of the walls LW and RW. The object recognizer 112 recognizes a position and a size of other vehicle m2 present in the travel section in front of the host vehicle M.

In the third determination pattern, the determiner 120 determines whether the host vehicle M can travel by passing next to the other vehicle m2 without coming into contact with the other vehicle m2. In this case, the road condition recognizer 114 first recognizes a fifth distance D7 from the other vehicle m2 to the marking line RL1 that is present far away among the left and right marking lines LL and RL1 that divide the traveling path of the host vehicle M. Then, the determiner 120 determines that the host vehicle M can pass next to it while traveling on the first lane L1 when the fifth distance D7 is equal to or greater than a predetermined distance, and determines that the vehicle M cannot pass next to it while traveling on the first lane L1 when the fifth distance D7 is less than the predetermined distance. The predetermined distance used for the third determination pattern may be set in the same manner as, for example, for the first determination pattern.

If the fifth distance D7 is less than the predetermined distance, the road condition recognizer 114 recognizes a sixth distance D8 from the other vehicle m2 to the boundary of the free space FS2 that is present farther away than the marking line RL1 when viewed from the other vehicle m2. Then, the determiner 120 determines whether the sixth distance D8 is equal to or greater than the upper limit distance, and when the sixth distance D8 is equal to or greater than the upper limit distance, even if the sixth distance D8 is equal to or greater than the predetermined distance, it is determined that the host vehicle M cannot pass next to the other vehicle m2 by crossing the marking line RL1 (the host vehicle M cannot travel by crossing the marking line RL1). In the processing described above, instead of the sixth distance D8, a distance D9 from the marking line RL1 on the right side when viewed from the host vehicle M to the boundary of the free space FS2 may be used, and a lane width of the second lane L2 (a distance D10) may also be used.

As a result, for example, when the second lane L2 is an oncoming lane, it is possible to prevent the host vehicle M from coming into contact with an oncoming vehicle traveling on the second lane L2 while traveling by crossing the marking line RL1. When the second lane L2 is an adjacent lane in which the host vehicle can travel in the same direction as the first lane L1, it is possible to prevent the host vehicle M from coming into contact with a following vehicle (a vehicle behind) traveling in the second lane L2 while traveling by crossing the marking line RL1. Since the wall RW is present at a position away from the host vehicle M, there is a possibility that the sixth distance D8 is misrecognized. For this reason, it is possible to suppress an erroneous determination as to passage possibility due to the misrecognition.

Based on a result of the third determination pattern, the HMI controller 130 generates information (an image and a voice) on passage possibility as in the case of the first determination pattern, and causes the HMI 30 to output it. Specifically, the HMI controller 130 generates information such as information indicating that the host vehicle can pass next to the other vehicle M2 while traveling on the first lane L1 or an image indicating a route K3 through which the host vehicle M needs to pass, and causes the HMI 30 to output the generated information. The HMI controller 130 may cause the HMI 30 to output information indicating a result of the determination when it is determined that the host vehicle M cannot travel by crossing the marking line RL1. As a result, the driver can drive the host vehicle by determining whether to pass next to the other vehicle m2 by crossing the marking line RL1 based on his or her own determination while actually checking the road condition of the second lane L2.

<Fourth Determination Pattern>

Figure 5:
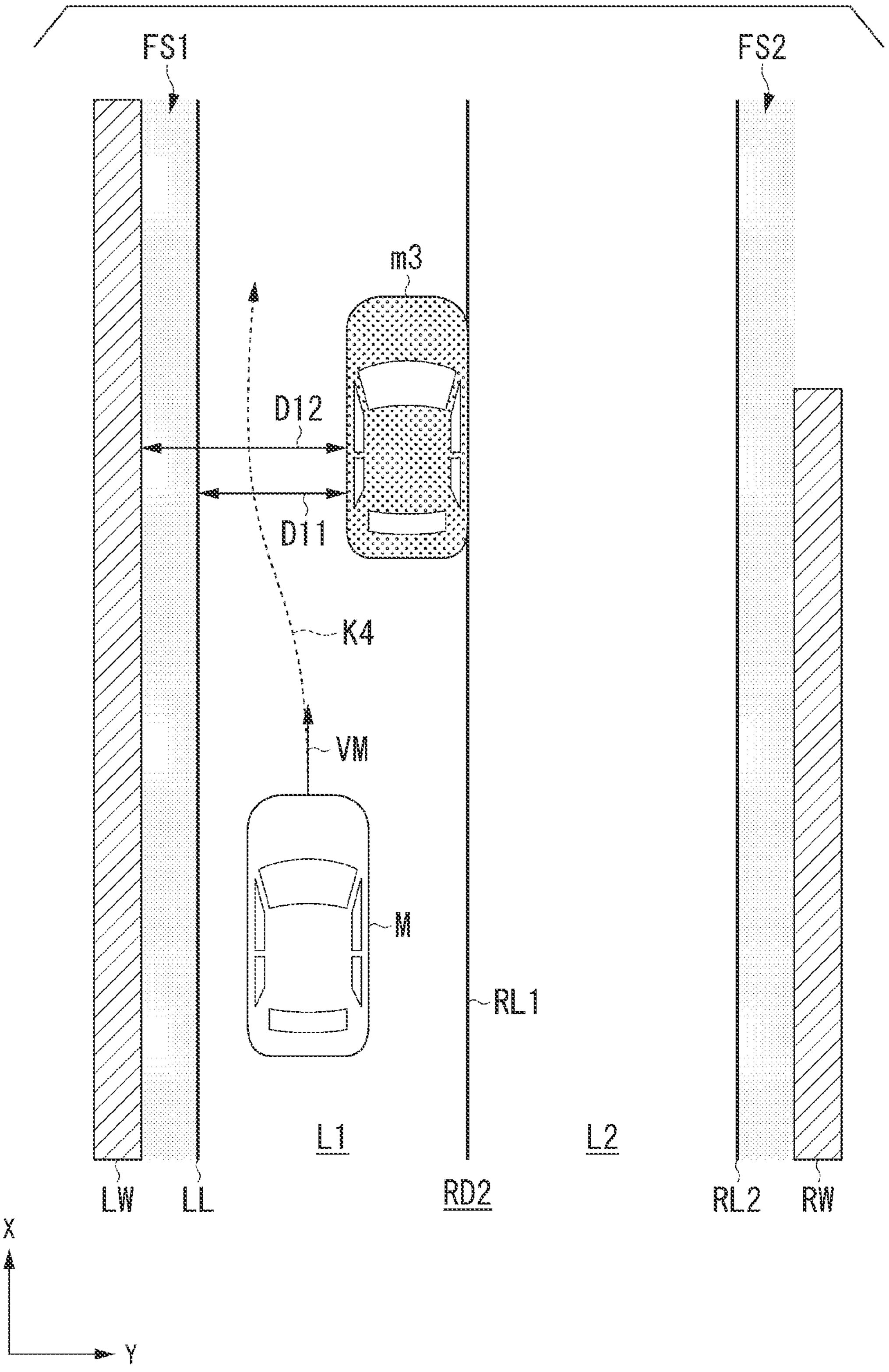
FIG. 5 is a diagram for describing a fourth determination pattern.

Next, a fourth determination pattern will be described. FIG. 5 is a diagram for describing the fourth determination pattern. The fourth determination pattern differs from the third determination pattern in that the position of the other vehicle when viewed from the host vehicle M is different. Specifically, as shown in FIG. 5, there is a scene in which other vehicle m3 is temporarily stopped on the marking line RL1 side of the first lane L1 (on the right side when viewed from the host vehicle M). In such a scene, it can be inferred that the other vehicle m3 is temporarily stopped to turn right, and in that case, it can be inferred that the second lane L2 is an oncoming lane. Therefore, the determiner 120 determines whether a seventh distance D11 between the left marking line LL of the other vehicle m3 recognized by the road condition recognizer 114 and the other vehicle m3 is equal to or greater than a predetermined distance. Here, since the other vehicle m3 shown in FIG. 5 is in a temporarily stopped state, it is recognized as a static obstacle. For this reason, a predetermined distance used for the fourth determination pattern may be set in the same manner as, for example, for the first determination pattern.

The determiner 120 determines that the host vehicle can pass next to the other vehicle m3 while traveling on the first lane L1 when the seventh distance D11 is equal to or greater than the predetermined distance, and when the seventh distance D11 is less than the predetermined distance, the determiner 120 determines whether an eighth distance D12 from the other vehicle m3 to the boundary of the free space FS1 is equal to or greater than a predetermined distance. The determiner 120 determines that the host vehicle M can pass next to the other vehicle m3 by crossing the marking line LL when the eighth distance D12 is equal to or greater than the predetermined distance, and determines that the host vehicle M cannot pass next to the other vehicle m3 when the eighth distance D12 is less than the predetermined distance.

When the determiner 120 determines that the host vehicle can pass next to the other vehicle m3, the HMI controller 130 generates information such as information indicating that the host vehicle M can pass or an image indicating a route K4 through which the host vehicle M needs to pass, and causes the HMI 30 to output the generated information. When the determiner 120 determines that the host vehicle cannot pass next to the other vehicle m3, the HMI controller 130 may cause the HMI 30 to output information indicating that the host vehicle M cannot pass next to the other vehicle m3. Since it is predicted that the other vehicle m3 will move (turn right) in the near future, the HMI controller 130 may generate information prompting the host vehicle M to temporarily stop and resume traveling after the other vehicle m3 turns right, and cause the HMI 30 to output it.

According to the third and fourth determination patterns described above, in addition to having the same effect as the first determination pattern described above, it is possible to perform more appropriate driving assistance depending on a condition of an obstacle ahead even in a road condition where there are a plurality of lanes.

The determiner 120 may perform control so as not to perform the determination processing described above when a condition around the host vehicle M recognized by the recognizer 110 is a predetermined condition (determination OFF control). For example, the determiner 120 performs control so as not to perform the determination processing described above when the recognizer 110 cannot recognize a marking line for dividing the road on which the host vehicle M travels, or when a degree of recognition of a marking line is less than a threshold value. The degree of recognition of a marking line is set by the road condition recognizer 114, but a setting method may be the same as a method of setting the degree of recognition of an object (wall) described above.

Since it is not possible to specify which direction the driver of the host vehicle M will move when the position of the host vehicle M is near an intersection (less than a predetermined distance from the intersection), the determiner 120 performs control so as not to perform the determination processing described above. When an obstacle in front of the travel section of the host vehicle M is a specific object with a high degree of freedom of operation, such as a person or a bicycle, the determiner 120 may also perform control so as not to determine whether the host vehicle can pass next to the specific object.

The determiner 120 does not need to perform the determination processing described above when the speed of other vehicle approaching the host vehicle M is equal to or higher than a predetermined speed, or when an angle of the approaching other vehicle in a traveling direction with respect to the traveling direction of the host vehicle M is within a predetermined angle range. A predetermined angle range is, for example, a predetermined range centered on 90 degrees (for example, about 60 to 120 degrees).

The determiner 120 may perform control so as not to perform the determination processing described above when an angle of deviation between the traveling direction of the host vehicle M and an extension direction of a marking line is equal to or greater than a predetermined angle, when a curvature of a marking line is equal to or greater than a predetermined value, and when it is predicted that the degree of recognition of an object will clearly decrease due to weather, time of day, or the like. As a result, more appropriate driving assistance can be provided depending on a condition and the surrounding conditions of the host vehicle M.

[Processing Flow]

Figure 6:
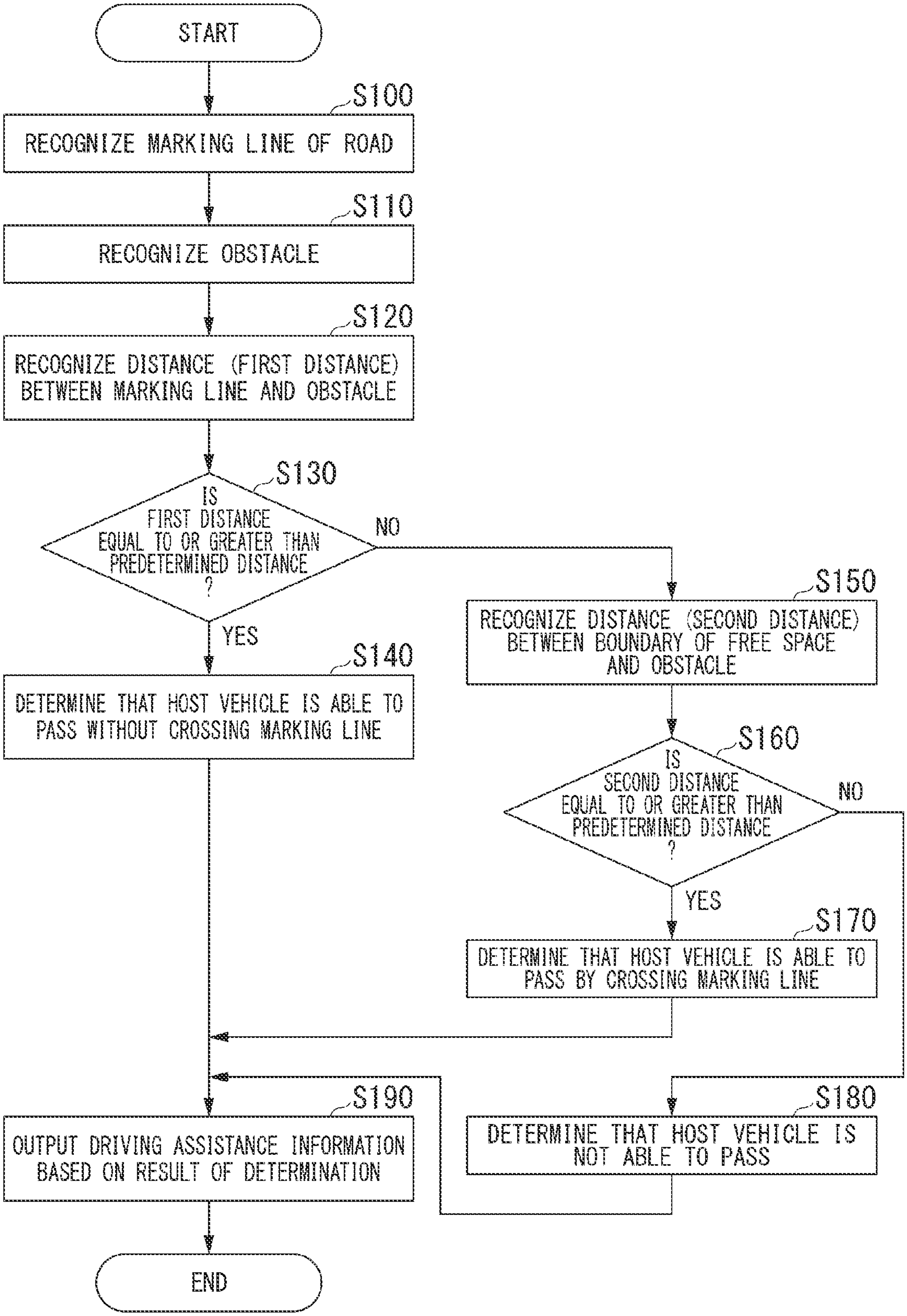
FIG. 6 is a flowchart which shows an example of a flow of a series of processing by the driving assistance device of the embodiment.

Hereinafter, a series of processing by the driving assistance device 100 of the embodiment will be described using a flowchart. FIG. 6 is a flowchart which shows an example of a flow of a series of processing performed by the driving assistance device 100 according to the embodiment. In the processing of FIG. 6, among various types of processing executed by the driving assistance device 100, description will be provided by mainly focusing on the determination processing using the first and second determination patterns and the output processing of driving assistance information based on a result of the determination processing. The processing of this flowchart may be, for example, repeatedly executed at a predetermined timing or cycle.

In the example of FIG. 6, the recognizer 110 recognizes a marking line of the road (a traveling path) on which the host vehicle M travels (step S100). Next, the recognizer 110 recognizes an obstacle present in front of the host vehicle M (step S110), and recognizes a distance (a first distance) between the marking line and the obstacle (step S120). Next, the determiner 120 determines whether the recognized first distance is equal to or greater than a predetermined distance (step S130). When it is determined that the first distance is equal to or greater than the predetermined distance, the determiner 120 determines that the host vehicle can pass next to the obstacle without crossing the marking line (step S140).

In processing of step S130, when it is determined that the first distance is not equal to or greater than the predetermined distance (less than the predetermined distance), the recognizer 110 recognizes a distance (a second distance) between a boundary of a free space that is away from the obstacle farther than a marking line and the obstacle (step S150). Next, the determiner 120 determines whether the recognized second distance is equal to or greater than a predetermined distance (step S160). When it is determined that the second distance is equal to or greater than the predetermined distance, the determiner 120 determines that the host vehicle M can pass next to the obstacle by crossing the marking line (step S170). When it is determined that the second distance is not equal to or greater than the predetermined distance (less than the predetermined distance), the determiner 120 determines that the host vehicle M cannot pass next to the obstacle (step S180).

Next, the HMI controller 130 generates driving assistance information based on a result of the determination (a result of processing of step S140, S170, or S180) and causes the HMI 30 to output it (step S190). For example, when it is determined that the host vehicle can pass without crossing the marking line, the HMI controller 130 generates an image or a voice indicating that the host vehicle can pass without crossing the marking line, and causes the HMI 30 (a display 32 or a speaker 34) to output it or generates an image indicating a recommended route through which the host vehicle can pass without crossing the marking line and causes the display 32 to display it. When it is determined that the host vehicle can pass by crossing the marking line, the HMI controller 130 generates an image or a voice indicating that the host vehicle can pass by crossing the marking line and causes the HMI 30 to output it, or generates an image indicating a recommended route through which the host vehicle can pass by crossing the marking line and causes the display 32 to display it. When it is determined that the host vehicle cannot pass, the HMI controller 130 generates an image or a voice indicating that the host vehicle cannot pass and causes the HMI 30 to output it, or outputs predetermined information such as a warning to the HMI 30. As a result, the processing of this flowchart ends.

Modified Example

For example, the vehicle system 1 of the embodiment may be equipped with a driving control device (not shown) that controls one or both of steering and a speed of the host vehicle M to execute driving control of the host vehicle M. In this case, instead of (or in addition to) providing driving assistance information to the driver, the driving assistance device 100 may execute driving control so that the host vehicle M may travel on the routes (recommended routes) K1 to K4 on the basis of a result of the determination described above, and may also control an automatic driving control system so as to temporarily stop the host vehicle M until a dynamic obstacle moves.

In the embodiment, when a plurality of obstacles are present in front of the host vehicle M, determination using the determination pattern described above may be performed on each obstacle, and the determination described above may be performed by setting priorities for obstacles and using the obstacles in descending order of priority or those having a priority equal to or higher than a threshold value as targets. In this case, the priority may be set higher as an obstacle is closer to the host vehicle M, or may be set higher as the obstacle is larger. The priority may be set higher for dynamic obstacles than for static obstacles, and may be set depending on the type of an obstacle. When a distance between a plurality of obstacles is less than a predetermined distance, the determination may be performed by regarding the plurality of obstacles as one obstacle.

According to the embodiment described above, the driving assistance device 100 includes the recognizer 110 that recognizes the surrounding conditions of the host vehicle M, the determiner 120 that determines whether the host vehicle M can pass through the traveling section ahead on the basis of a result of the recognition by the recognizer 110, and the HMI controller 130 (an example of an output controller) that causes an HMI 30 (an example of an output) to output information based on a result of the determination by the determiner 120. The determiner 120 determines that the host vehicle M can pass next to an obstacle when a first distance between a marking line that divides the traveling path of the host vehicle M recognized by the recognizer 110 and the obstacle in front of the host vehicle M is equal to or greater than a predetermined distance, and thereby it is possible to provide the driver of a vehicle with more appropriate driving assistance. According to the embodiment, for example, when the host vehicle M travels on a narrow road, it is possible to appropriately determine whether the vehicle M can pass by an obstacle in front of the host vehicle M on the basis of the road condition. Therefore, according to the embodiment, it is possible to contribute to development of a sustainable transportation system.

The embodiments described above can be expressed as follows.

A driving assistance device includes a storage medium configured to store computer-readable instructions and a processor that is connected to the storage medium, in which the processor executes the computer-readable instructions to recognize surrounding conditions of a host vehicle, determine whether the host vehicle is able to pass through a traveling section ahead on the basis of a result of the recognition, cause an output to output information based on a result of the determination, and determine that the host vehicle is able to pass next to an obstacle when a first distance between a recognized marking line for dividing a traveling path of the host vehicle and the obstacle in front of the host vehicle is equal to or greater than a predetermined distance.

Although a mode for carrying out the present invention has been described above using the embodiment, the present invention is not limited to the embodiment, and various modifications and substitutions can be made within a range not departing from the gist of the present invention.

What is claimed is:

1. A driving assistance device comprising:
a processor that executes instructions to:
recognize surrounding conditions of a host vehicle;
determine whether the host vehicle is able to pass through a traveling section ahead on the basis of a result of the recognition; and
cause an output to output information based on a result of the determination,
wherein, when a first distance between a marking line for dividing a traveling path of the host vehicle, which is recognized, and an obstacle in front of the host vehicle is equal to or greater than a predetermined distance, the processor determines that the host vehicle is able to pass next to the obstacle,
wherein, when the first distance is less than the predetermined distance, the processor recognizes a second distance between a boundary of a free space present on an opposite side of the obstacle when viewed from the marking line and the marking line, and
when the second distance is equal to or greater than the predetermined distance, the processor determines that the host vehicle is able to pass next to the obstacle by crossing the marking line.

2. The driving assistance device according to claim 1, wherein, when the processor recognizes a part serving as the boundary of the free space as a wall, and a degree of recognition of the wall is less than a threshold value, the processor determines that the host vehicle is not able to pass next to the obstacle even if the second distance is equal to or greater than the predetermined distance.

3. The driving assistance device according to claim 1,
wherein the processor determines that the host vehicle is not able to pass next to the obstacle by crossing the marking line when a distance from the marking line to the boundary of the free space is equal to or greater than an upper limit distance.

4. The driving assistance device according to claim 1,
wherein the predetermined distance is made different depending on whether the obstacle is a static obstacle or a dynamic obstacle,
the predetermined distance is longer for the dynamic obstacle than for the static obstacle.

5. A driving assistance method comprising:
by a computer,
recognizing surrounding conditions of a host vehicle;
determining whether the host vehicle is able to pass through a traveling section ahead on the basis of a result of the recognition;
causing an output to output information based on a result of the determination;
determining that the host vehicle is able to pass next to the obstacle when a first distance between a recognized marking line for dividing a traveling path of the host vehicle and an obstacle in front of the host vehicle is equal to or greater than a predetermined distance;
when the first distance is less than the predetermined distance, recognizing a second distance between a boundary of a free space present on an opposite side of the obstacle when viewed from the marking line and the marking line; and
when the second distance is equal to or greater than the predetermined distance, determining that the host vehicle is able to pass next to the obstacle by crossing the marking line.

6. A computer-readable non-transitory storage medium that has stored a program causing a computer to execute
recognizing surrounding conditions of a host vehicle;
determining whether the host vehicle passes through a traveling section ahead on the basis of a result of the recognition;
causing an output to output information based on a result of the determination;
determining that the host vehicle is able to pass next to the obstacle when a first distance between a recognized marking line for dividing a traveling path of the host vehicle and an obstacle in front of the host vehicle is equal to or greater than a predetermined distance;
when the first distance is less than the predetermined distance, recognizing a second distance between a boundary of a free space present on an opposite side of the obstacle when viewed from the marking line and the marking line; and
when the second distance is equal to or greater than the predetermined distance, determining that the host vehicle is able to pass next to the obstacle by crossing the marking line.

* * * * *